United States Patent
Hsia (10) Patent No.: US 9,967,927 B2
(45) Date of Patent: May 8, 2018

(54) LINEAR SOLID-STATE LIGHTING WITH GALVANIC ISOLATION

(71) Applicant: Aleddra Inc., Renton, WA (US)

(72) Inventor: Chungho Hsia, Bellevue, WA (US)

(73) Assignee: ALEDDRA INC., Renton, WA (US)

( * ) Notice: Subject to any disclaimer, the term of this patent is extended or adjusted under 35 U.S.C. 154(b) by 0 days. days.

(21) Appl. No.: 15/362,772

(22) Filed: Nov. 28, 2016

(65) Prior Publication Data

US 2017/0079115 A1    Mar. 16, 2017

Related U.S. Application Data (63) Continuation-in-part of application No. 15/225,748, filed on Aug. 1, 2016, now Pat. No. 9,743,484, which is a continuation-in-part of application No. 14/818,041, filed on Aug. 4, 2015, now Pat. No. 9,420,663, which is a continuation-in-part of application No. 14/688,841, filed on Apr. 16, 2015, now Pat. No. 9,288,867, which is a
(Continued)

(51) Int. Cl.
| | |
|---|---|
| *H05B 33/08* | (2006.01) |
| *F21K 9/278* | (2016.01) |
| *F21V 15/015* | (2006.01) |
| *H02M 1/32* | (2007.01) |
| *H05B 37/02* | (2006.01) |
| *F21V 25/12* | (2006.01) |
| *F21Y 115/10* | (2016.01) |
| *F21V 25/04* | (2006.01) |
| *H02M 1/00* | (2006.01) |

(52) U.S. Cl.
CPC ........ *H05B 33/0803* (2013.01); *H02M 1/32* (2013.01); *F21K 9/278* (2016.08); *F21V 25/04* (2013.01); *F21V 25/12* (2013.01); *F21Y 2115/10* (2016.08); *H02M 2001/0058* (2013.01); *H05B 37/0272* (2013.01); *Y02B 20/386* (2013.01); *Y02B 70/1491* (2013.01)

(58) Field of Classification Search
None
See application file for complete search history.

(56) References Cited

U.S. PATENT DOCUMENTS

| | | | |
|---|---|---|---|
| 9,657,905 B2* | 5/2017 | Coleiny | F21K 9/27 |
| 2011/0176297 A1* | 7/2011 | Hsia | F21V 25/04 |
| | | | 362/217.1 |

(Continued)

*Primary Examiner* — Minh D A
*Assistant Examiner* — James H Cho
(74) *Attorney, Agent, or Firm* — Han IP Corporation; Andy M. Han (57) ABSTRACT

A linear light-emitting diode (LED)-based solid-state lamp comprising an LED driving circuit, LED arrays, at least one pair of electrical contacts, and a controller, is used to replace a fluorescent tube or a conventional LED tube lamp in an existing lamp fixture. The controller and the at least one pair of electrical contacts are configured to perform galvanic isolation between the controller and the LED driving circuit connecting with LED arrays. Thus an overall through-lamp electric shock current can be limited only from the controller, eliminating a substantial electric shock current flow through the LED driving circuit and subsequently the LED arrays. The scheme can effectively reduce a risk of electric shock and an internal fire hazard to users during relamping or maintenance.

8 Claims, 4 Drawing Sheets

Related U.S. Application Data continuation-in-part of application No. 14/465,174, filed on Aug. 21, 2014, now Pat. No. 9,277,603, which is a continuation-in-part of application No. 14/135,116, filed on Dec. 19, 2013, now Pat. No. 9,163,818, which is a continuation-in-part of application No. 13/525,249, filed on Jun. 15, 2012, now Pat. No. 8,749,167.

(56) References Cited

U.S. PATENT DOCUMENTS

| | | | | |
|---|---|---|---|---|
| 2012/0043892 | A1* | 2/2012 | Visser | F21V 25/04 |
| | | | | 315/121 |
| 2012/0300445 | A1* | 11/2012 | Chu | F21V 25/04 |
| | | | | 362/217.13 |
| 2014/0191659 | A1* | 7/2014 | Wu | H05B 33/0812 |
| | | | | 315/53 |
| 2014/0300274 | A1* | 10/2014 | Acatrinei | H05B 33/0815 |
| | | | | 315/85 |

* cited by examiner

LINEAR SOLID-STATE LIGHTING WITH GALVANIC ISOLATION

CROSS-REFERENCE TO RELATED APPLICATIONS

The present disclosure is part of a continuation-in-part (CIP) application of U.S. patent application Ser. No. 15/225,748, filed 1 Aug. 2016 and issued as U.S. Pat. No. 9,743,484 on 22 Aug. 2017, which is a CIP application of U.S. patent application Ser. No. 14/818,041, filed 4 Aug. 2015 and issued as U.S. Pat. No. 9,420,663 on 16 Aug. 2016, which is a CIP application of U.S. patent application Ser. No. 14/688,841, filed 16 Apr. 2015 and issued as U.S. Pat. No. 9,288,867 on 15 Mar. 2016, which is a CIP application of U.S. patent application Ser. No. 14/465,174, filed 21 Aug. 2014 and issued as U.S. Pat. No. 9,277,603 on 1 Mar. 2016, which is a CIP application of U.S. patent application Ser. No. 14/135,116, filed 19 Dec. 2013 and issued as U.S. Pat. No. 9,163,818 on 20 Oct. 2015, which is a CIP application of U.S. patent application Ser. No. 13/525,249, filed 15 Jun. 2012 and issued as U.S. Pat. No. 8,749,167 on 10 Jun. 2014. The above-identified applications are incorporated herein by reference in their entirety.

BACKGROUND

Technical Field

The present disclosure relates to linear light-emitting diode (LED) lamps and more particularly to a linear LED lamp with galvanic isolation configured to prevent accidental LED current from reaching ground through a person's body.

Description of the Related Art

Solid-state lighting from semiconductor light-emitting diodes (LEDs) has received much attention in general lighting applications today. Because of its potential for more energy savings, better environmental protection (no hazardous materials used), higher efficiency, smaller size, and much longer lifetime than conventional incandescent bulbs and fluorescent tubes, the LED-based solid-state lighting will be a mainstream for general lighting in the near future. As LED technologies develop with the drive for energy efficiency and clean technologies worldwide, more families and organizations will adopt LED lighting for their illumination applications. In this trend, the potential safety concerns such as risk of electric shock become especially important and need to be well addressed.

In today's retrofit application of a linear LED tube (LLT) lamp to replace an existing fluorescent tube, consumers may choose either to adopt a ballast-compatible LLT lamp with an existing ballast used to operate the fluorescent tube or to employ an AC mains-operable LED lamp by removing/bypassing the ballast. Either application has its advantages and disadvantages. In the former case, although the ballast consumes extra power, it is straightforward to replace the fluorescent tube without rewiring, which consumers may have a first impression that it is the best alternative to fluorescent tube lamps. But the fact is that total cost of ownership for this approach is high regardless of very low initial cost. For example, the ballast-compatible LLT lamps work only with particular types of ballasts. If the existing ballast is not compatible with the ballast-compatible LLT lamp, the consumers will have to replace the ballast. Some facilities built long time ago incorporate different types of fixtures, which requires extensive labor for both identifying ballasts and replacing incompatible ones. Moreover, a ballast-compatible LLT lamp can operate longer than the ballast. When an old ballast fails, a new ballast will be needed to replace in order to keep the ballast-compatible LLT lamps working. Maintenance will be complicated, sometimes for lamps and sometimes for ballasts. The incurred cost will preponderate over the initial cost savings by changeover to the ballast-compatible LLT lamps for hundreds of fixtures throughout a facility. When the ballast in a fixture dies, all the ballast-compatible tube lamps in the fixture go out until the ballast is replaced. In addition, replacing a failed ballast requires a certified electrician. The labor costs and long-term maintenance costs will be unacceptable to end users. From energy saving point of view, a ballast constantly draws power, even when the ballast-compatible LLT lamps are dead or not installed. In this sense, any energy saved while using the ballast-compatible LLT lamps becomes meaningless with the constant energy use by the ballast. In the long run, ballast-compatible LLT lamps are more expensive and less efficient than self-sustaining AC mains-operable LLT lamps.

On the contrary, an AC mains-operable LLT lamp does not require a ballast to operate. Before use of an AC mains-operable LLT lamp, the ballast in a fixture must be removed or bypassed. Removing or bypassing the ballast does not require an electrician and can be replaced by end users. Each AC mains-operable LLT lamp is self-sustaining. If one AC mains-operable tube lamp in a fixture goes out, other lamps in the fixture are not affected. Once installed, the AC mains-operable LLT lamps will only need to be replaced after 50,000 hours. In view of above advantages and disadvantages of both ballast-compatible LLT lamps and AC mains-operable LLT lamps, it seems that market needs a most cost-effective solution by using a universal LLT lamp that can be used with the AC mains and is compatible with an electronic ballast so that LLT lamp users can save an initial cost by changeover to such a universal LLT lamp followed by retrofitting the lamp fixture to be used with the AC mains when the ballast dies.

In the U.S. patent application Ser. No. 14/688,841, filed Apr. 16, 2015, two shock prevention switches and an all-in-one driving circuit are adopted in an LLT lamp such that AC power from either an electronic ballast or the AC mains can operate the lamp without operational uncertainty and electric shock hazards. In other words, no matter what a lamp fixture is configured as the AC mains or an electronic ballast compatible fashion, the LLT lamp automatically detects configurations and works for either one. All of such LLT lamps, no matter whether AC mains-operable or ballast compatible, are electrically wired as double-ended and have one construction issue related to product safety and needed to be resolved prior to wide field deployment. This kind of LLT lamps, if no shock prevention scheme is adopted in, always fails a safety test, which measures a through-lamp electric shock current. Because an AC-mains voltage applies to both opposite ends of the tube when connected to a power source, the measurement of current leakage from one end to the other consistently results in a substantial current flow, which may present a risk of an electric shock during re-lamping. Due to this potential shock risk to the person who replaces the LLT lamps in an existing fluorescent tube fixture, Underwriters Laboratories (UL) uses its safety standard, UL 935, Risk of Shock During Relamping (Through Lamp), to do a current leakage test and to determine if the LLT lamps meet the consumer safety requirement. Although the LLT lamps used with an electronic ballast can pass the current leakage test, some kinds of electric shock hazards do exist. Experimental results show that the skin of the person who touches an exposed bi-pin may be burned due to such an electric shock. Fortunately, a mechanism of double shock prevention switches used in applications with the AC mains is also effective in applications with the ballasts to prevent the electric shock from occurring, thus protecting consumers from such a hazard, no matter whether input voltage is from the AC mains or the electronic ballast. Therefore, a universal LLT lamp that can work with either the AC mains or the electronic ballast makes sense. The effectiveness of using double shock prevention switches for applications in the AC mains has been well addressed in U.S. Pat. No. 8,147,091, issued on Apr. 3, 2012. However, a conventional shock prevention switch has an inherent issue related to an electric arc when operated with an electronic ballast. Unlike an AC voltage of 120 or 277 V/50-60 Hz from the AC mains, the output AC voltage and current from the electronic ballast presents a negative resistance characteristic. The feature that originally supports a fluorescent tube to function properly becomes extremely detrimental to the conventional shock prevention switch due to the electric arc likely occurring between two electrical contacts that have a high electrical potential difference with a high frequency, such as 600 V/50 kHz. Once a consumer fails to follow installation instructions to install or uninstall linear LED tube lamps such that one of two ends of the tube lamp is in the fixture socket connected to a powered electronic ballast, and the other end is tweaked to connect to or disconnect from the associated socket, an internal arcing may occur between the electrical contacts in the associated switch. The arcing even in a short period such as several seconds can generate high heat, burning and melting electrical contacts and neighboring plastic enclosures, creating a fire hazard. The AC voltage of 120 or 277 V/50~60 Hz from the AC mains does not have such an issue because its voltage is relatively low compared with the ballast output voltage of 600 V. Moreover, the AC frequency of 60 Hz automatically extinguishes an arc every ¹⁄₆₀ seconds, if existed. That is why a utility switch can be used in an electrical appliance to turn power on and off without any problem. However when used with the electronic ballast, the electrical contacts used in the conventional shock prevention switch can easily be burned out due to the high-voltage and high-frequency arcing introduced between each gap of each pair of the electrical contacts in the conventional shock prevention switch when someone tries to abusively tweak to remove the tube lamp from the fixture with the ballast that has a power on it. Although such a situation is rare, an internal arcing, if occurred, does cause burning and even welding of the electrical contacts and melting of the plastic enclosure, so called internal fire, creating consumer safety issues.

Today, such LLT lamps are mostly used in a ceiling light fixture with a wall-mount power switch. The ceiling light fixture could be an existing one used with fluorescent tubes but retrofitted for LLT lamps or a specific LLT lamp fixture. The drivers that provide a proper voltage and current to LED arrays could be internal or external ones. Not like LLT lamps with an external driver that is inherently electric-shock free if the driver can pass a dielectric withstand test used in the industry, LLT lamps with an internal driver could have a shock hazard during relamping or maintenance, when the substantial through-lamp electric shock current flows from any one of AC voltage inputs through the internal driver connecting to LED arrays to the earth ground. Despite this disadvantage, LLT lamps with the internal driver still receive wide acceptance because they provide a stand-alone functionality and an easy retrofit for an LLT lamp fixture. As consumerism develops, consumer product safety becomes extremely important. Any products with electric shock hazards and risk of injuries or deaths are absolutely not acceptable for consumers. However, commercially available LLT lamps with internal drivers, single-ended or double-ended, fail to provide effective solutions to the problems of possible electric shock and internal arcing and fire.

In the prior art mentioned above, the double shock protection switches with mechanical actuation mechanisms protruding outwards from both ends of the LLT lamp are proposed to be used in the LLT lamp. However, a length control of the LLT lamp becomes critical to operate the LLT lamp because sometimes the double shock protection switches may not be actuated by the mechanical actuation mechanisms. Also, the conventional LLT lamp is so vulnerable because it may cause internal fire if consumers abusively tweak the mechanical actuation mechanisms at both ends of the LLT lamp operable with an electronic ballast during relamping. It is therefore the purpose of the present disclosure to disclose a galvanic isolation approach to be used in the LLT lamp to eliminate above-mentioned electric shock and internal fire hazards and to work more reliably to protect consumers.

SUMMARY

A linear light-emitting diode (LED)-based solid-state lamp comprising an LED driving circuit, LED arrays, a controller, and at least one pair of electrical contacts controlled by the controller, is used to replace a fluorescent tube or a conventional LED tube lamp without the controller and the at least one pair of electrical contacts in an existing lamp fixture. The controller and the at least one pair of electrical contacts are configured to perform galvanic isolation between the controller and the LED driving circuit connecting with LED arrays and to control a through-lamp electric shock current flowing through the LED driving circuit and subsequently the LED arrays. The scheme can effectively reduce a risk of electric shock and a fire hazard to users during relamping or maintenance.

In one embodiment, the linear light-emitting diode (LED)-based solid-state lamp further comprises two lamp bases respectively connected to the two ends of the lamp, each lamp base comprising at least one electrical conductor connecting to a lamp fixture socket. When the at least one pair of electrical contacts are not electrically connected each other, the at least one electrical conductor in each lamp base is not electrically connected with the LED driving circuit connecting to the LED arrays. When the at least one electrical conductor in each lamp base is individually inserted into the lamp fixture sockets powered by AC mains or ballasts for fluorescent lamps, the at least one pair of electrical contacts are actuated to conduct a current and electrically connects the at least one electrical conductor in each lamp base with one of inputs to the LED driving circuit or ultimately to the LED arrays. In other words, the LED driving circuit and the LED arrays are not electrically connected to the at least one electrical conductor that may be exposed during relamping. Thus, an overall through-lamp electric shock current may be limited to a small amount of leakage current from the controller rather than the substantial electric shock current from the LED driving circuit and the LED arrays. The controller, which only supports an operation of the controller and an actuation of the at least of one pair of electrical contacts, indeed, has a much smaller power consumption than the LED arrays do. Experimental results show that the through-lamp electric shock current can be controlled to an acceptable level according to a safety standard UL 935.

In one embodiment, the at least one pair of electrical contacts are connected to the at least one electrical conductor connecting to a lamp fixture socket. In this case, the at least one pair of electrical contacts conduct an AC (alternate current) current. Other embodiments include the at least one pair of electrical contacts connected at one of inputs of either the LED driving circuit or the LED arrays to conduct a DC (direct current) current.

In one embodiment, the controller comprises a power module, an isolation module, and a signal module, in which the isolation module may be embodied by an opto-coupler or an opto-isolator, performing optical coupling to the signal module controlling the at least one pair of electrical contacts.

BRIEF DESCRIPTION OF THE DRAWINGS

Non-limiting and non-exhaustive embodiments of the present disclosure are described with reference to the following figures, wherein like reference numerals refer to like parts throughout the various figures unless otherwise specified.

DETAILED DESCRIPTION OF THE INVENTION

Figure 1:
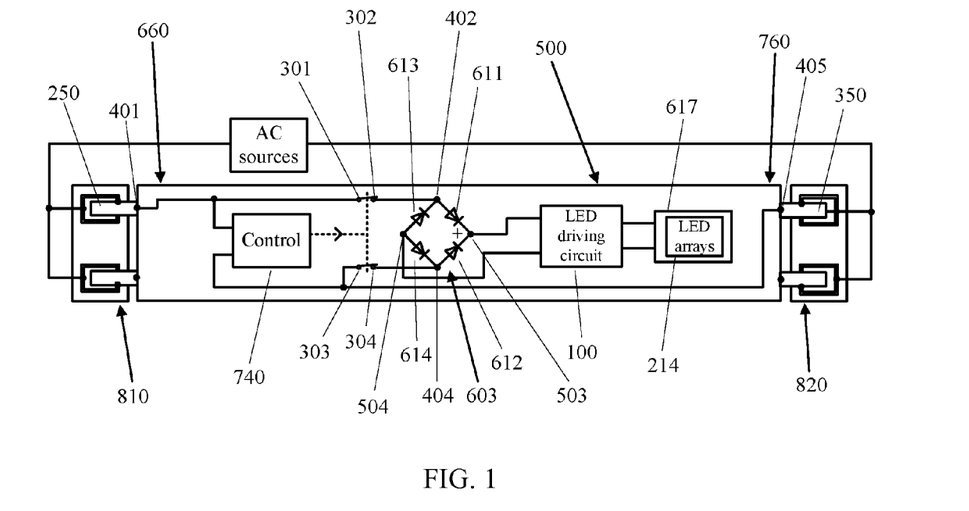
FIG. 1 is an embodiment of an LLT lamp installed in lamp fixture sockets connected with AC sources according to the present disclosure.

FIG. 1 is a block diagram of an LLT lamp installed in lamp fixture sockets connected with alternate current (AC) sources according to the present disclosure. The LLT lamp 500 comprises a housing having two ends; two lamp bases 660 and 760 each having at least one electrical conductor 250 and 350 at each end of the housing; a first pair of electrical contacts 301 and 302; a second pair of electrical contacts 303 and 304; a controller 740; a bridge rectifier 603 comprising diodes 611, 612, 613, and 614 interconnected at ports 402, 404, 503, and 504; an LED driving circuit 100 having a first and a second inputs 503 and 504; and LED arrays 214 disposed on an LED PCB 617 with the LED arrays 214 connected to LED driving circuit 100. When the first and the second pairs of electrical contacts 301, 302, 303, and 304 are not individually electrically connected, the at least one electrical conductor 250 and the at least one electrical conductor 350 are not electrically connected with the LED driving circuit 100. When the at least one electrical conductor 250 and the at least one electrical conductor 350 in each lamp base are inserted into the lamp fixture sockets 810 and 820, the controller 740 receives power from the AC sources and operates to individually actuate the first and the second pairs of electrical contacts 301, 302, 303, and 304 in a way that an electric current can conduct between the first pair of electrical contacts 301 and 302 and between the second pair of electrical contacts 303 and 304. For a positive cycle, the electric current from one port of the AC sources can flow from the electrical contact 401 of the at least one electrical conductor 250, the first pair of electrical contacts 301 and 302, the bridge rectifier 603 through the diode 611 to the first input 503 of the LED driving circuit 100, further down into LED arrays 214, and return to the second input 504 of the LED driving circuit 100. The electric current continues to flow through the diode 614 of the bridge rectifier 603, the second pair of electrical contacts 303 and 304, the electrical contact 405 of the at least one electrical conductor 350 to the other port of the AC sources, completing the positive half cycle power transfer. For a negative half cycle, the electric current from one port of the AC sources can flow from the electrical contact 405 of the at least one electrical conductor 350, the second pair of electrical contacts 303 and 304, the bridge rectifier 603 through the diode 612 to the first input 503 of the LED driving circuit 100, further down into LED arrays 214, and return to the second input 504 of the LED driving circuit 100. The electric current continues to flow through the diode 613 of the bridge rectifier 603, the first pair of electrical contacts 301 and 302, the electrical contact 401 of the at least one electrical conductor 250 to the other port of the AC sources, completing the negative half cycle power transfer.

When the lamp base 660 is inserted in the lamp socket 810, which connects to one port of the AC sources (say, the left side in FIG. 1), the LLT lamp 500 is energized. If the first and the second pairs of electrical contacts 301, 302, 303, and 304 do not exist to control the electric current conduction, a substantial through-lamp electric shock current from the LED driving circuit 100 and the LED arrays 214 can always come out through the at least one electrical conductor 350, which may be exposed to a user for an electric shock. The electric shock may be fatal depending on impedance between the user's body and the earth ground. On the other hand, if the first and the second pairs of electrical contacts 301, 302, 303, and 304 exist and are controlled by the controller 740, then the through-lamp electric shock current from the LED driving circuit 100 and the LED arrays 214 may ideally be zero. However, the through-lamp electric shock current will come out from the controller 740 that needs power to actuate the first and the second pairs of the electrical contacts 301, 302, 303, and 304. Because such a load is a fraction of the load from the LED arrays 214, its through-lamp electric shock current can be controlled to an acceptable level not exceeding a specific value defined in the safety standard UL 935, no fatal electric shock possible. In a normal operation when the at least one electrical conductor 250 and the at least one electrical conductor 350 are connected to AC mains or an electronic ballast in a double-ended wiring lamp fixture, the LED driving circuit 100 can receive power to drive the LED arrays 214. As can be seen in FIG. 1, two sockets in each of the external fixture lamp sockets 810 and 820 are shunted, meaning that as long as the at least one electrical conductor 250 in the lamp base 660 and the at least one electrical conductor 350 in the lamp base 760 connect to the AC sources, the LLT lamp can operate with an acceptable through-lamp electric shock current, which is deemed safe for users.

Figure 2:
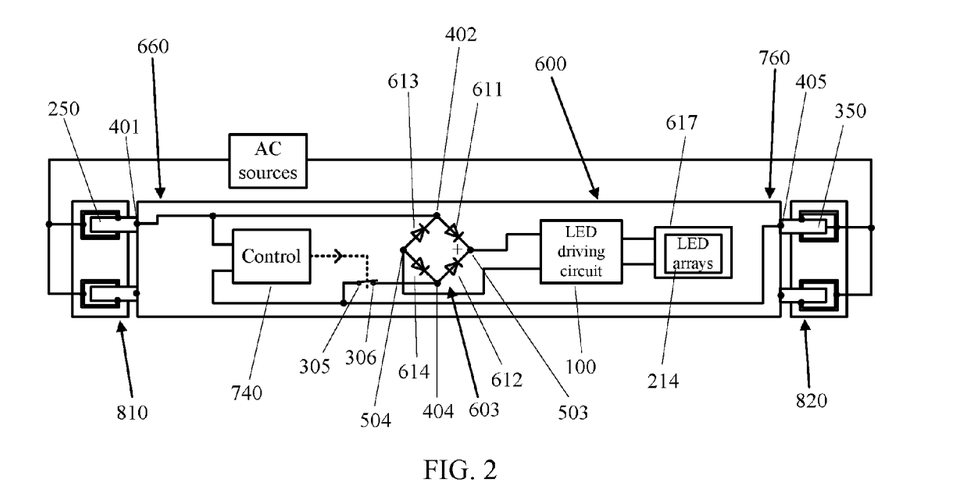
FIG. 2 is another embodiment of an LLT lamp installed in lamp fixture sockets according to the present disclosure.

FIG. 2 is another embodiment of an LLT lamp 600 installed in lamp fixture sockets connected with AC sources according to the present disclosure. FIG. 2 is similar to FIG. 1 except that the first pair of electrical contacts 301 and 302 and the second pair of electrical contacts 303 and 304 in FIG. 1 are replaced with at least one pair of electrical contacts 305 and 306 in FIG. 2. When the at least one pair of electrical contacts 305 and 306 are not electrically connected, the at least one electrical conductor 250 and 350 in each lamp base is not electrically connected with the LED driving circuit 100. When both the at least one electrical conductor 250 and 350 in each lamp base are inserted into the lamp fixture sockets 810 and 820, the controller 740 receives power from the AC sources and operates to actuate the pair of electrical contacts 305 and 306 in a way that an electric current can conduct between the pair of electrical contacts 305 and 306. For a positive cycle, the electric current from one port of the AC sources can flow from the electrical contact 401 of the at least one electrical conductor 250, the bridge rectifier 603 through the diode 611 to the first input 503 of the LED driving circuit 100, further down into LED arrays 214, and return to the second input 504 of the LED driving circuit 100. The electric current continues to flow through the diode 614 of the bridge rectifier 603, the at least one pair of electrical contacts 305 and 306, the electrical contact 405 of the at least one electrical conductor 350 to the other port of the AC sources, completing the positive half cycle power transfer. For a negative half cycle, the electric current from one port of the AC sources can flow from the electrical contact 405 of the at least one electrical conductor 350, the at least one pair of electrical contacts 305 and 306, the bridge rectifier 603 through the diode 612 to the first input 503 of the LED driving circuit 100, further down into LED arrays 214, and return to the second input 504 of the LED driving circuit 100. The electric current continues to flow through the diode 613 of the bridge rectifier 603, the electrical contact 401 of the at least one electrical conductor 250 to the other port of the AC sources, completing the negative half cycle power transfer.

When the lamp base 660 is inserted in the lamp socket 810, which connects to one port of the AC sources, the LLT lamp 600 is energized. If the at least one pair of electrical contacts 305 and 306 do not exist to conduct or block the electric current flow, a substantial through-lamp electric shock current from the LED driving circuit and the LED arrays 214 can always come out through the at least one electrical conductor 350, which may be exposed to a user for an electric shock. On the other hand, if the at least one pair of electrical contacts 305 and 306 exist and are controlled by the controller 740, then the through-lamp electric shock current from the LED driving circuit 100 and the LED arrays 214 may ideally be zero. However, the through-lamp electric shock current will come out from the controller 740 that needs power to actuate the at least one pair of electrical contacts 305 and 306. Because such a load is a fraction of the load from the LED arrays 214, its through-lamp electric shock current can be controlled to an acceptable level not exceeding a specific value defined by a safety standard UL 935. In a normal operation when the at least one electrical conductors 250 and the at least one electrical conductor 350 are connected to AC mains or an electronic ballast in a double-ended wiring lamp fixture, the LED driving circuit 100 can receive power to drive the LED arrays 214.

Figure 3:
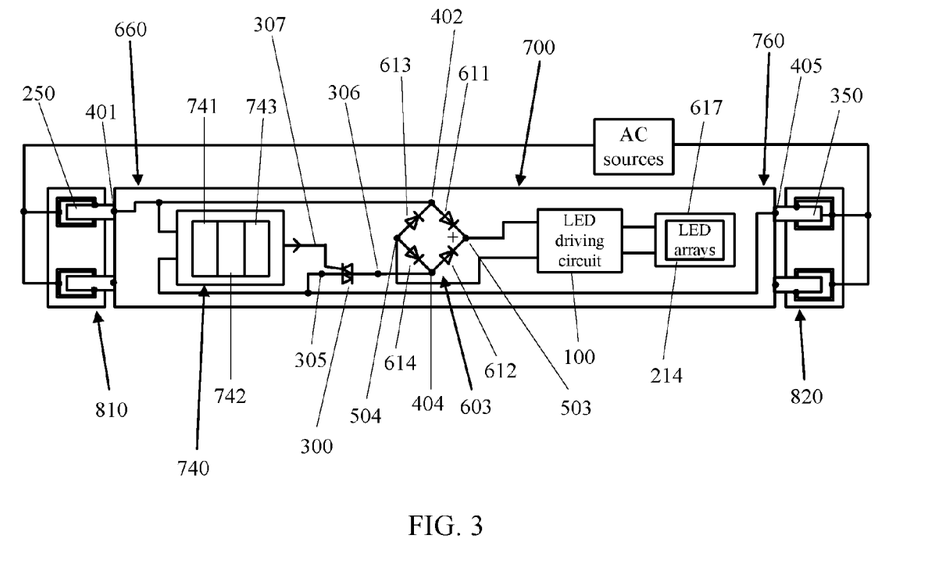
FIG. 3 is another embodiment of the LLT lamp shown in FIG. 2 according to the present disclosure.

FIG. 3 is another embodiment of an LLT lamp shown in FIG. 2 according to the present disclosure. In FIG. 3, the LLT lamp 700 comprises almost all the components depicted in FIG. 2 except two components. First, the at least one pair of electrical contacts 305 and 306 in FIG. 2 are replaced with a triac 300 with two device terminals 305 and 306 in FIG. 3. Second, the controller 740 in FIG. 3 further comprises a power module 741, an isolation module 742, and a signal module 743. When the power module 741 receives no power, the isolation module 742 is off, and the signal module 743 sends no signal to the gate port 307 of the triac 300. In this case, the triac 300 acts as an open switch, and the LED driving circuit 100 and the LED arrays 214 conduct no current. When both the lamp bases 660 and 760 are respectively inserted in the lamp sockets 810 and 820, which respectively connect to the two ports of the AC sources, the power module 741 receives power to turn on the isolation module 742 and the signal module 743, which then sends a signal to the gate port 307 of the triac 300 to gate "on" the triac 300, thus switching full power to the LED driving circuit 100 and the LED arrays 214. Although the at least one pair of electrical contacts 305 and 306 in FIG. 2 are embodied by the triac 300 in FIG. 3, they may be an electrical, an electronic, an electro-mechanical, or a mechanical switch such as one in a solid-state relay, an electronic relay, an electro-mechanical relay, a pair of mechanical contacts, or other bidirectional current control devices. Also the triac 300 may be connected with some snubber circuits to protect the triac 300 from voltage spikes.

Figure 4:
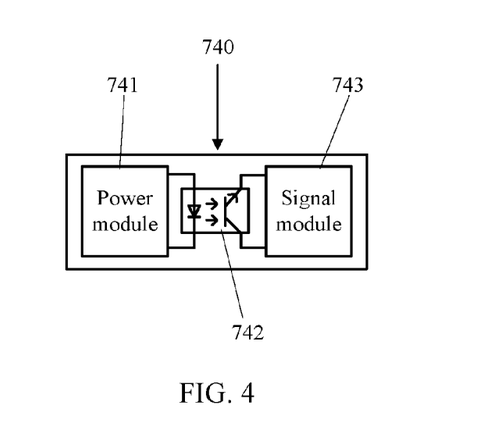
FIG. 4 is a function block diagram of a controller according to the present disclosure.

FIG. 4 is a functional block diagram of the controller 740 in FIG. 3. The controller 740 in FIG. 4 comprises the power module 741, the isolation module 742, and the signal module 743, as depicted in FIG. 3. The isolation module 742 is used to couple a control signal—a low voltage generated from the power module 741 to the signal module 743, which then gates the triac 300 (in FIG. 3) "on". This kind of galvanic isolation is essential especially for applications using electronic relays or switches to prevent unwanted current from flowing between the LED driving circuit 100 and the controller 740. In FIG. 4, the low voltage signal energizes an internal LED which illuminates and switches on a photo-voltaic photo-sensitive diode. The diode current may turn on subsequent the at least one pair of electrical contacts 305 and 306 (in FIG. 3) such as the triac 300 in FIG. 3 or a back-to-back thyristor to switch a large current load from the LED driving circuit 100 and the LED arrays 214. The optical coupling allows the controller 740, which is of an electrical type or an opto-electronic type, to be electrically isolated from the LED driving circuit 100 and the LED arrays 214. Thus, when either one of the lamp bases 660 and 760 is not inserted in the lamp sockets 810 or 820, a substantial through-lamp electric shock current flowing from the LED driving circuit 100 and LED arrays 214 will not appear at the exposed electrical conductor in the lamp base not inserted in a lamp socket, creating no electric shock hazard. That is, the substantial through-lamp electric shock current flowing from the LED driving circuit 100 and LED arrays 214 is effectively blocked by the at least one pair of electrical contacts 305 and 306, which are "open-circuited".

Figure 5:
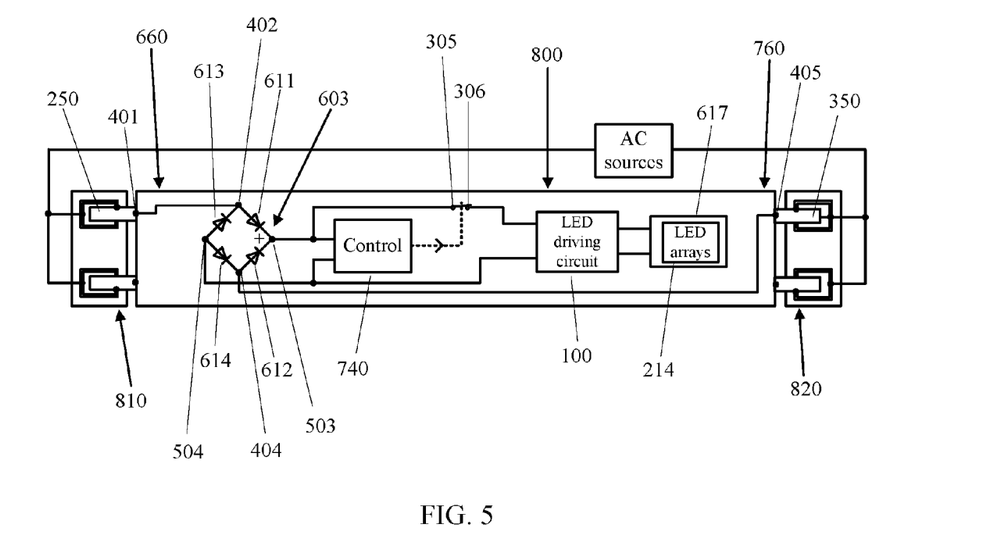
FIG. 5 is another embodiment of an LLT lamp installed in lamp fixture sockets with at least one pair of electrical contacts at one of inputs of an LED driving circuit according to the present disclosure.

Although the at least one pair of electrical contacts in FIGS. 1 and 2 and the triac 300 in FIG. 3 are shown connected in front of the bridge rectifier 603 for conducting AC current, they can be connected in back of the bridge rectifier 603 for a direct current (DC) configuration without departing from the scope in this disclosure. FIG. 5 is another embodiment of an LLT lamp 800 installed in lamp fixture sockets with at least one pair of electrical contacts 305 and 306 at one of inputs of an LED driving circuit according to the present disclosure. FIG. 5 is similar to FIG. 3 except that the controller 740 receives a DC voltage from the bridge rectifier 603 rather than an AC voltage from the at least one conductor 250 and the at least one electrical conductor 350 in each lamp base in FIGS. 2 and 3, and the at least one pair of electrical contacts 305 and 306 are connected at the first input 503 of the LED driving circuit 100 whereas the first and the second inputs 503 and 504 of the LED driving circuit 100 are connected to two inputs of the controller 740. Because the first and the second inputs 503 and 504 of the LED driving circuit 100 are respectively a positive and a negative potential ports of the bridge rectifier 603, the controller 740 receives power from the rectified DC voltage. That is, although the controller 740 connects to an AC side in FIGS. 2 and 3, the controller 740 may receive the DC voltage from the bridge rectifier 603, further regulated to a low voltage to operate the controller 740 as shown in FIG. 5 as long as galvanic isolation between the LED driving circuit 100 and the controller 740 exists. The galvanic isolation ensures that the control signal can be transferred from the controller 740 to actuate the triac 300 (in FIG. 3) or the at least one pair of electrical contacts 305 and 306 while maintaining its independent power current flow out of the current through the LED driving circuit 100 and the LED arrays 214. Although the galvanic isolation is obtained by the isolation module 742 embodied by an internal LED illuminating and switching on a photo-sensitive diode in FIG. 4, an opto-coupler, an opto-isolator, or other possible means may be used.

As recited above in depicting FIG. 3, when only the lamp base 660 is inserted in the lamp socket 810, which connects to one port of the AC sources, the LLT lamp 800 is energized. If the at least one pair of electrical contacts 305 and 306 do not exist to conduct or block the DC current flow, a substantial through-lamp electric shock current from the LED driving circuit 100 and the LED arrays 214 can always come out through the at least one electrical conductor 350, which may be exposed to a user for an electric shock, no matter whether the at least one pair of electrical contacts 305 and 306 are connected to AC or DC side of the bridge rectifier 603. However, if the at least one pair of electrical contacts 305 and 306 are in place, then the through-lamp electric shock current from the LED driving circuit 100 and the LED arrays 214 can be blocked by the at least one pair of electrical contacts 305 and 306, which are set "open" by the controller 740. Instead, the through-lamp electric shock current that may go out of the exposed electrical conductor 350 will flow from the controller 740 that needs power to actuate the at least one pair of electrical contacts 305 and 306. Similar to the case in FIGS. 2 and 3, the through-lamp electric shock current from the controller 740 can be controlled to an acceptable level not exceeding a specific value defined in a safety standard UL 935, as mentioned above. When both the at least one electrical conductor 250 and the at least one electrical conductor 350 in each lamp base are inserted into the lamp fixture sockets 810 and 820, the controller 740 receives power from the rectified DC voltage and operates to actuate the at least one pair of electrical contacts 305 and 306 in a way that a DC current can conduct between the pair of electrical contacts 305 and 306. Thus, the LED driving circuit 100 can receive power from the at least one electrical conductor 250 and the at least one electrical conductor 350 in each lamp base connected to the AC mains or the electronic ballast in a double-ended wiring lamp fixture to power the LED arrays 214. Although the at least one pair of electrical contacts 305 and 306 are, shown in FIG. 5, connected at the first input 503 of the LED driving circuit 100, the at least one pair of electrical contacts 305 and 306 may be connected at the second input 504 of the LED driving circuit 100.

Figure 6:
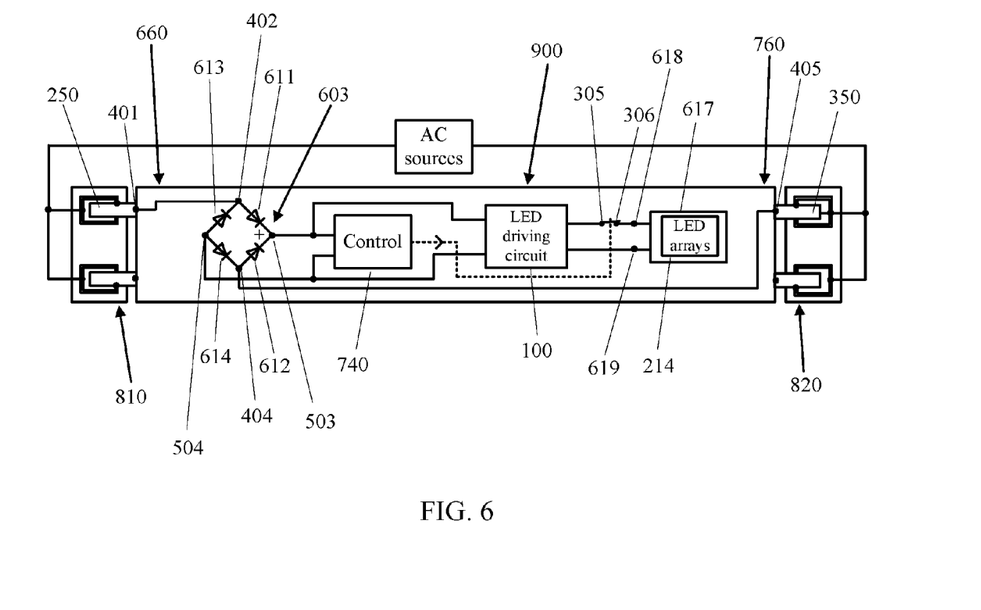
FIG. 6 is another embodiment of an LLT lamp installed in lamp fixture sockets with at least one pair of electrical contacts at one of inputs of LED arrays according to the present disclosure.

FIG. 6 is another embodiment of an LLT lamp 900 installed in lamp fixture sockets with one pair of electrical contacts at one of inputs of LED arrays according to the present disclosure. FIG. 6 is similar to FIG. 5 with all the components labeled with same numerals except that the at least one pair of electrical contacts 305 and 306 are connected at a first input 618 of the LED arrays 214. As can be seen, a substantial through-lamp electric shock current can always flow through the LED arrays 214 and ultimately reach the earth ground if the at least one pair of electrical contacts 305 and 306 are not connected at the first input 618 of LED arrays 214 to block the DC current from the LED arrays 214. Although the at least one pair of electrical contacts 305 and 306 are, shown in FIG. 6, connected at the first input 618 of the LED arrays 214, the at least one pair of electrical contacts 305 and 306 may be connected at a second input 619 of the LED arrays 214. In FIGS. 5 and 6, the at least one pair of electrical contacts 305 and 306 may be an electrical, an electronic, an electro-mechanical, or a mechanical switch such as one in a solid-state relay, an electronic relay, an electro-mechanical relay, a pair of mechanical contacts, or other bidirectional and unidirectional current control devices such as a triac, a back-to-back thyristor, a silicon-controlled rectifier (SCR), a transistor, a metal-oxide-semiconductor field-effect transistor (MOSFET), or various combinations thereof. Also such devices may be connected with some snubber circuits to maintain their functionality under voltage spikes.

Figure 7:
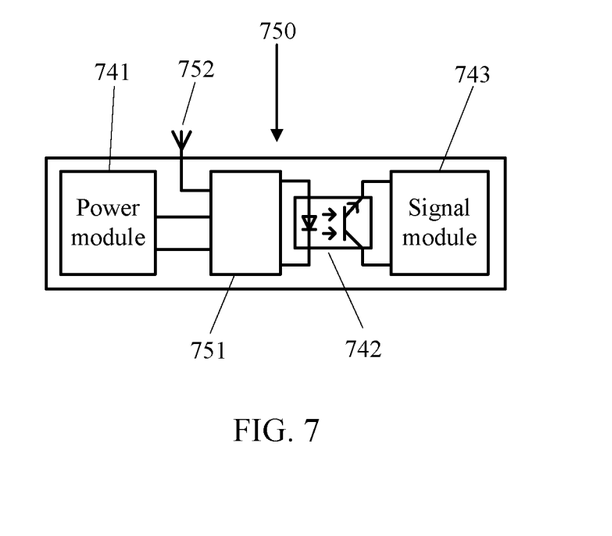
FIG. 7 is another embodiment of a controller depicted in FIG. 4 according to the present disclosure.

FIG. 7 is another embodiment of a controller depicted in FIG. 4 according to the present disclosure. In FIG. 7, a controller 750 is similar to the controller 740 depicted in FIG. 4 except that the controller 750 further comprises a receiver 751 comprising a signal input 752 receiving a signal to control the at least one pair of electrical contacts depicted in FIGS. 1-3, 5, and 6. The receiver 751 may comprise a wireless receiver comprising a radio receiver, an infrared receiver, an audio receiver, or an internet-based receiver controllable by a smart phone. The receiver may comprise a hardwired receiver operating based on a protocol of RS232, RS485, DMX512, Universal Serial Bus (USB), or Digital Addressable Lighting Interface (DALI).

The AC sources are used in FIGS. 1-3, 5, and 6 to show that the through-lamp electric shock current from the LED driving circuit 100 and the LED arrays 214 can be blocked by using the at least one pair of electrical contacts controllable to reduce a risk of electric shock. Such AC sources include the AC mains from an electrical grid and power supplies from various ballasts, electronic or magnetic. Although the galvanic isolation for consumer safety is obtained by supplying the AC sources from the opposite ends of the LLT lamp illustrated in FIGS. 1-3, 5, and 6, the use of such galvanic isolation is not limited only to such double-ended LLT lamps. A single-ended or a mixed single-double-ended LLT lamp may also adopt the galvanic isolation approach to protect consumers according to the present disclosure. Furthermore, the at least one pair of electrical contacts in the present disclosure are controlled by the controller 740 using the galvanic isolation rather than a mechanical means proposed in the prior art. Therefore, the LLT lamp adopting the galvanic isolation approach can potentially provide a more reliable operation free of electric shock. When used with electronic ballasts, an internal arcing will never occur between at least one pair of electrical contacts, thus eliminating any internal fire hazard.

Whereas preferred embodiments of the present disclosure have been shown and described, it will be realized that alterations, modifications, and improvements may be made thereto without departing from the scope of the following claims. Another kind of the shock prevention schemes in an LED-based lamp using various kinds of combinations to accomplish the same or different objectives could be easily adapted for use from the present disclosure. Accordingly, the foregoing descriptions and attached drawings are by way of example only, and are not intended to be limiting.

What is claimed is:

1. A linear light-emitting diode (LED) tube lamp, comprising:
    a housing having two ends;
    at least one light-emitting diode printed circuit board (LED PCB) disposed between the two ends of the housing, the at least one LED PCB having LED arrays fixed thereon, the LED arrays having two inputs;
    an LED driving circuit connecting to the LED arrays on the at least one LED PCB, the LED driving circuit having two inputs;
    two lamp bases respectively connected to the two ends of the housing, each lamp base comprising at least one electrical conductor connecting to a lamp fixture socket;
    at least one pair of electrical contacts; and
    a controller receiving power from a rectified direct current (DC) voltage, the controller comprising an isolation module configured to perform galvanic isolation between the controller and the LED driving circuit connecting to the LED arrays,
    wherein:
        when the at least one pair of electrical contacts are not electrically connected, a through-lamp electric shock current does not flow through the LED arrays; and
        when the at least one electrical conductor in each lamp base is inserted into the lamp fixture socket, the at least one pair of electrical contacts are actuated to deliver electrical power from the at least one electrical conductor in each lamp base to the LED arrays.

2. The linear LED tube lamp of claim 1, wherein the isolation module comprises an opto-coupler or an opto-isolator.

3. The linear LED tube lamp of claim 1, wherein the at least one pair of electrical contacts comprise electrical terminals of at least one triac.

4. The linear LED tube lamp of claim 1, wherein the at least one pair of electrical contacts comprise electrical terminals of at least one electronic switch comprising a metal-oxide-semiconductor field-effect transistor (MOSFET), a transistor, a back-to-back thyristor, a silicon-controlled rectifier (SCR), or a combination thereof.

5. The linear LED tube lamp of claim 1, wherein the controller further comprises a wireless receiver configured to receive a signal and to control the at least one pair of electrical contacts.

6. The linear LED tube lamp of claim 5, wherein the wireless receiver comprises a radio receiver, an infrared receiver, an audio receiver, or an internet-based receiver controllable by a smart phone.

7. The linear LED tube lamp of claim 1, wherein the controller comprises a hardwired receiver configured to receive a signal and to control the at least one pair of electrical contacts.

8. The linear LED tube lamp of claim 7, wherein the hardwired receiver operates based on a protocol of RS232, RS485, DMX512, Universal Serial Bus (USB), or Digital Addressable Lighting Interface (DALI).

* * * * *